United States Patent [19]

Williams

[11] Patent Number: 5,203,378

[45] Date of Patent: Apr. 20, 1993

[54] HIGH-FLEXIBILITY, NONCOLLAPSING LIGHTWEIGHT HOSE

[75] Inventor: David A. Williams, Pittsburgh, Pa.

[73] Assignee: United States Department of Energy, Washington, D.C.

[21] Appl. No.: 648,931

[22] Filed: Feb. 1, 1991

[51] Int. Cl.⁵ .............................................. F16L 55/00
[52] U.S. Cl. .................................. 138/109; 138/104; 138/110; 138/113; 285/133.1
[58] Field of Search ............... 138/110, 104, 109, 121, 138/122, 113, 111, 114, 118; 285/133.1; 128/911

[56] References Cited

U.S. PATENT DOCUMENTS

| | | | |
|---|---|---|---|
| 4,274,549 | 6/1981 | Germain | 138/113 |
| 4,507,916 | 2/1986 | Antal et al. | 138/104 |
| 4,718,568 | 1/1988 | Palu | 138/113 |
| 4,922,971 | 5/1990 | Grantham | 138/109 |
| 5,005,613 | 4/1991 | Stanley | 138/113 |

Primary Examiner—James E. Byant, III
Attorney, Agent, or Firm—William R. Moser; Judson R. Hightower; Richard E. Constant

[57] ABSTRACT

A high-flexibility, noncollapsing, lightweight, large-bore, wire-reinforced hose is inside fiber-reinforced PVC tubing that is flexible, lightweight, and abrasion resistant. It provides a strong, kink- and collapse-free conduit for moving large quantities of dangerous fluids, e.g., removing radioactive waste water or processing chemicals.

4 Claims, 2 Drawing Sheets

HIGH-FLEXIBILITY, NONCOLLAPSING LIGHTWEIGHT HOSE

This invention was conceived and made in the course of or under Contract No. DE-AC 11-76 PN00014 with the U.S. Department of Energy.

BACKGROUND OF THE INVENTION

This invention relates generally to a high-flexibility, lightweight, noncollapsing hose and more particularly to such a hose having a large size and particularly useful as equipment for draining a radioactively contaminated fluid through a noncontaminated, isolated and restricted space with high confidence against kinking, collapse, or leaking even with large relative motion between the inlet and outlet ends of the hose.

In the operation of nuclear facilities, such as nuclear reactors, processing plants for nuclear fuels and related materials, and chemical processing plants, for example, it is necessary to handle radioactively and/or chemically contaminated fluids which in many instances must be conducted, such as for draining purposes, through a noncontaminated, isolated and restricted space without contamination of the surrounding area. Conduction of such contaminated fluids through uncontaminated environments in practice requires the highest confidence that the hose will not kink, collapse, break, or leak even though the hose may be subject to a large amount of motion relative to the inlet and outlet ends of the hose. Any such breaking, or leaking would result in undesirable contamination of the area through which the hose passes which could result in major damage and/or in the requirement to shut down the operation for cleanup and decontamination processing of the area.

Additional problems are also encountered in processing plants for contaminated materials due to the fact that hoses conducting the contaminated liquids or gases pass through inaccessible, restricted spaces requiring extreme flexibility in the hose, but with the assurance that the hose will neither kink nor collapse to close off the flow.

BRIEF SUMMARY OF THE INVENTION

It is an object of this invention to provide a high-flexibility, noncollapsing hose which overcomes the above problems and assures safe conduction of contaminated fluids through noncontaminated areas.

It is a further object of the invention to provide a high-flexibility, noncollapsing hose for conducting radioactively contaminated water through noncontaminated water in the restricted space between a nuclear fuel shipping container, or an irradiated equipment disposal container, and the anticontamination enclosure therefor. Such operations are usually conducted under water and the hose inside the anticontamination enclosure is not accessible for correction of kinks or collapsed sections.

The instant invention achieves these objectives by providing a high-flexibility, noncollapsing hose comprising lightweight wire-reinforced ducting which will not collapse or kink and may be easily damaged by abrasion, inside a fiber-reinforced PVC tubing which is extremely flexible, lightweight and abrasion resistant and has pressure ratings sufficient to be utilized for the purposes intended. The inner ducting may have an insufficient pressure rating and may be easily damaged by abrasion. Therefore the unique combination of the outer PVC tubing which is extremely flexible, lightweight, abrasion resistant and has sufficient pressure ratings provides a solution to the difficult requirement for a strong, lightweight, highly flexible kink and collapse free hose. The invention further provides pressure-equalizing holes, preferably in novel end connections, which prevents rupture of the inner duct and allows the hose assembly to drain when removed from the water.

In a practical application of the invention in a nuclear fuel shipping container, the hose is inside the anticontamination enclosure and is not accessible for relief of kinks or collapsed sections. In addition, anticontamination enclosures are usually opaque thereby making it extremely difficult to locate collapsed or kinked sections. The flexibility of the instant invention facilitates removal of the anticontamination enclosure as the container is lifted from the water while the contaminated water is being drained from the container through the high-flexibility hose. If the contaminated water cannot drain due to a collapsed drain hose, the container could not be lifted from the water because of limited capacity of the crane.

The invention is in no sense limited to use with radioactive fluids and materials, but is also useful in chemical processing or any other operation where it is desired or necessary to provide a kink free, noncollapsing, lightweight hose of relatively large size.

BRIEF DESCRIPTION OF THE DRAWINGS

The invention will now be described in detail with reference to the accompany drawings wherein.

DETAILED DESCRIPTION

Figure 1:
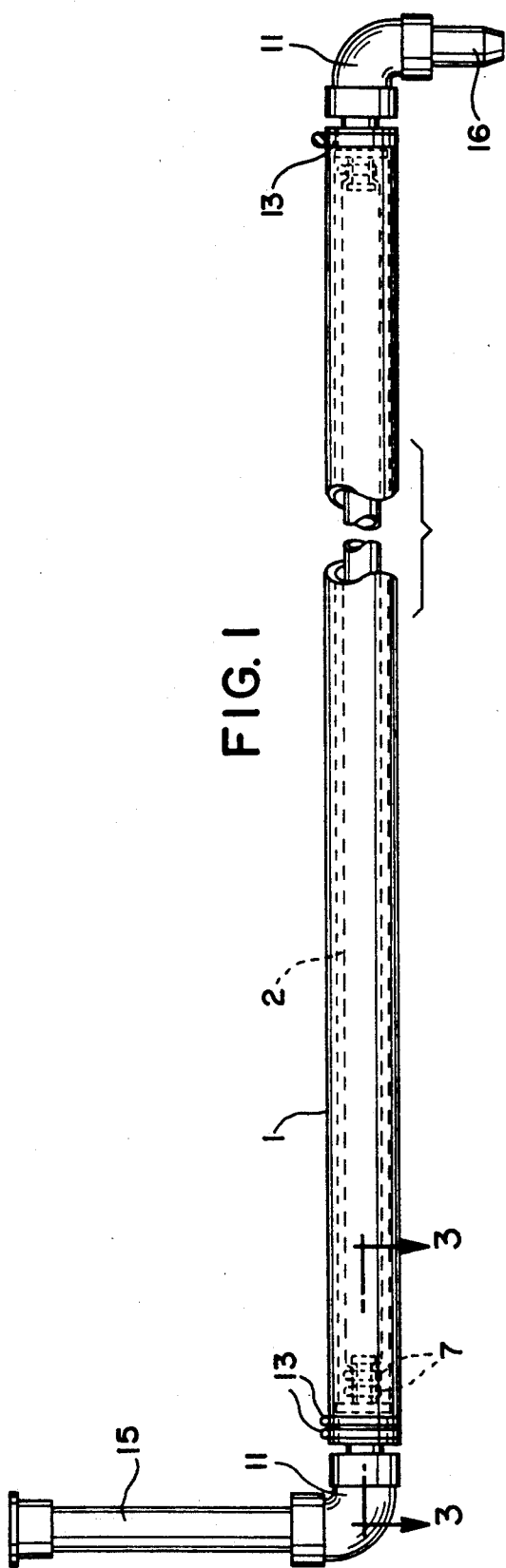
FIG. 1 is a schematic elevational view of the hose installed in a drain line assembly and showing end fittings in accordance with the invention.
Figure 2:
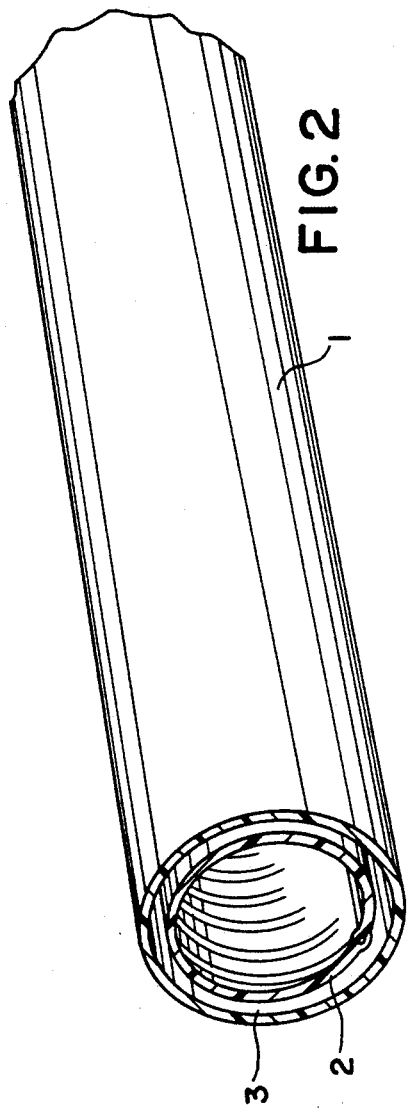
FIG. 2 is a perspective view of the hose in accordance with the invention.

With reference to FIGS. 1 and 2, the hose of this invention has an outer fiber-reinforced polyvinylchloride (PVC) tubular member 1 of fiber-reinforced PVC tubing which is extremely flexible, lightweight and abrasion resistant, and an inner tubular duct having high-flexibility, noncollapsing, and light weight characteristics. An annular space 3 is provided between the two tubular members throughout the length of the hose. A wire-reinforced tubing 2 may be of a type available in the commercial market such as PVC flexible duct which will not collapse or kink, but does not have adequate pressure capability or abrasion resistance to ensure that the hose would not leak if used alone under the adverse environmental conditions for which the hose is intended to be used, and has a pressure rating in the range of approximately 1 to 10% of the system pressure. The outer PVC tubing is fiber-reinforced to withstand 100% of the system pressure and is highly flexible, but would readily collapse and kink if used alone for the intended purpose of this invention. This outer tubing 1 may be of the type available on the commercial market.

A lightweight hose is required for the intended use, for example because the anticontamination enclosure through which the hose passes is made from a relatively fragile membrane material (not shown) which must also support the weight of the hose. In 3 in. diameter and larger sizes commercially available flexible hoses are relatively stiff and heavy, so that such hoses are unsuitable for the intended application of this invention.

Figure 3:
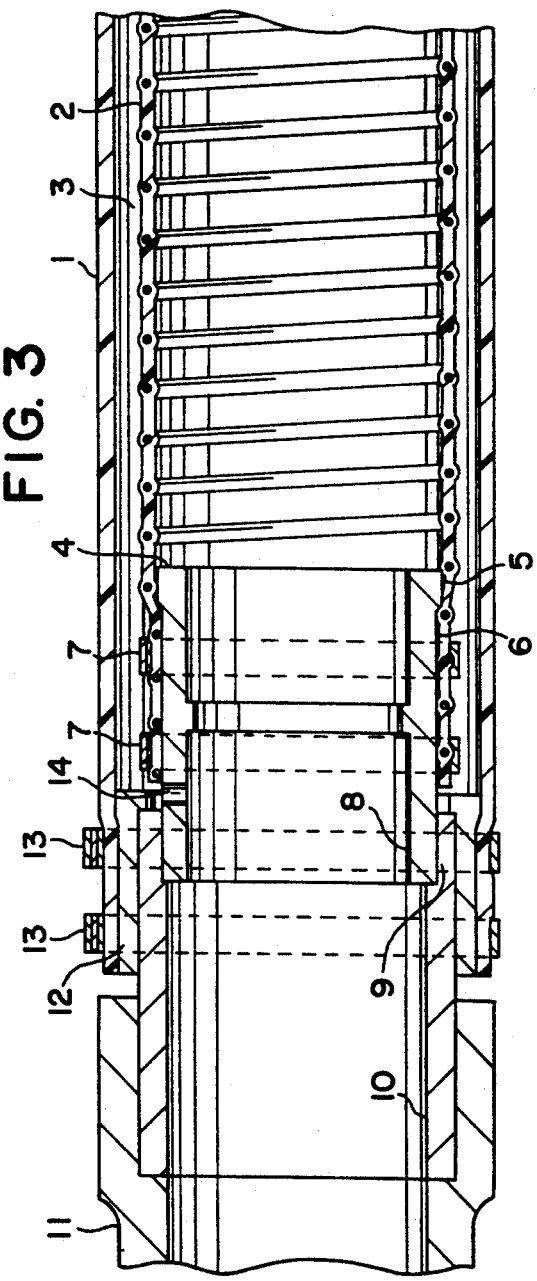
FIG. 3 is a cross sectional view taken along line 3—3 of FIG. 1 showing a typical detail of an end connection for the hose in accordance with the invention.

FIG. 3 shows in cross section a detail of typical end fittings for use with a multi-tube hose in accordance with the invention. The inner coupling sleeve 4 is a tubular member which may be made of PVC material and has an inner end section having an outer diameter which is preferable slightly less than the inner diameter of inner tubular member 2 and preferably has a central reduced diameter section 6 for insertion into the end of the inner tubular member. Hose clamps 7, of a type which would be well known to one having ordinary skill in this art, are provided, around the end of inner tubular member 2 into which inner coupling sleeve 4 is inserted for tightening and sealing the end of the inner tubular member to the outer surface of the inner coupling sleeve as shown. The outer end section 8 of inner coupling sleeve 4 is insertable into end section 9 of outer coupling sleeve 10, which may be a separate part in sealed engagement with, or an integral part of, an end fitting 11, such as a tubular hose connector or pipe elbow, for example. Coupling outer sleeve 10 and end fitting 11 may also be of PVC material. Tubular spacer 12 is fitted over the outer end portion of outer coupling sleeve 10 and the outer end of outer tubular member 1 is fitted over the outer surface of spacer 12. Hose clamps 13 are provided around the end of the outer tubular member 1 surrounding the spacer 12 which in turn surrounds the end section 9 of outer coupling sleeve 1. Hose clamps 13 are tightened in use to seal the assembly comprised of the end of, outer tubular member 1 and members 4, 10 and 12 so that there is no leakage of fluid from inside the hose end connection to the ambient environment. Member 12 may also be of PVC material.

In use the other end of the hose preferably has the same end fittings, or connector assembly, as described above and shown in FIG. 3.

Vent holes 14 are provided, preferably, but not necessarily, through coupling sleeve 4, interconnect the interior of tubular member 2 to the space 3 between the two tubular members 1 and 2, which function as pressure-equalizing holes which prevent rupture of the inner tubular under working pressure and allow the hose assembly to drain when desired.

In this manner the higher pressure resistant outer tubular member 1 sustains the pressure under operating conditions and the lower pressure rating of the inner tubular member 2 is no longer a limiting factor in the use of the hose.

In a practical application of the invention, the hose is connected at one end as shown in FIG. 1 to an elbow 11 which is connected to a drain pipe 15 from a nuclear fuel shipping container (not shown), for example, through which the contaminated fluid is drained. The other end of the hose is connected to a further elbow 11 to which a drain connection 16 is fitted.

In a typical application the inner tubular member 2 may be a 3 in. I.D. spiral wire reinforced PVC flexible duct and the outer tubular member may be a 4 in. I.D. Lay-flat fiber reinforced PVC tubing so that the annular space 3 therebetween is approximately ½ in. in radial thickness. The fiber-reinforced PVC outer tubular member has a pressure rating in excess of 40 psi.

Figure 4:
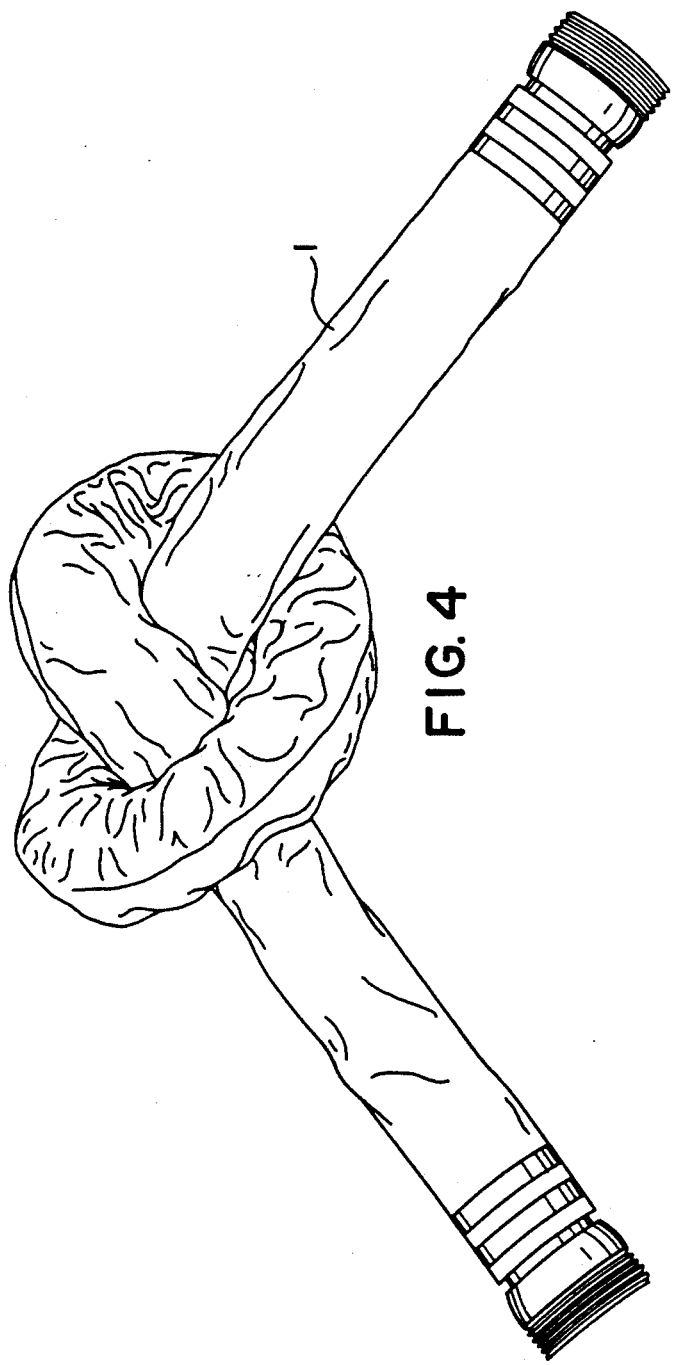
FIG. 4 is a perspective view showing the hose of the invention twisted in the form of a knot.

It has been found that the hose of the invention, as described above, may be twisted as shown in FIG. 4 without collapsing or kinking, and is still capable of retaining its original integrity thus assuring that the flow through the hose will not be cut off even when severely twisted as shown in FIG. 4 and will not collapse, break, or leak, thus making the invention suitable for conducting contaminated fluids through noncontaminated or environmentally pure areas.

I claim:

1. A large, lightweight, non-collapsing fluid-conducting hose comprising:

an outer highly flexible and collapsible tubular member;

an inner flexible, lightweight, and non-collapsing tubular member disposed within said outer tubular member so that the combination forms a flexible non-collapsing hose wherein said inner and outer tubular members are in radially spaced relationship to provide an annular space between said inner and outer tubular members;

vent means for communicating said annular space with the inside of said inner tubular member to maintain substantially equal pressure on the inner and outer surfaces of said inner tubular member;

at least one end fitting; and a coupling means for connecting said end fitting to the ends of said inner and outer tubular members substantially concentrically in a sealing relationship, and for connecting said hose to a fluid-handling system;

wherein said coupling means comprises:

a tubular spacer inserted into the end of said outer tubular member;

an outer coupling sleeve inserted partially into said tubular spacer and partially into said end fitting, sealed with said end fitting and said tubular spacer;

at least one hose clamp around the outer surface of said outer tubular member for clamping said end of said outer tubular member in sealing engagement with said tubular spacer and said outer coupling sleeve;

an inner coupling sleeve inserted partially into said outer coupling sleeve and partially into said inner tubular member and having a middle part exposed to said annular space; and at least one hose clamp around said inner tubular member for clamping said inner tubular member in sealing engagement with said inner coupling sleeve.

2. The hose claimed in claim 5 wherein:

said outer tubular member comprises fiber reinforced PVC tubing; and said inner tubular member comprises wire reinforced PVC tubing.

3. The hose as claimed in claim 1 wherein said vent means comprises:

a hole through said middle part of said inner coupling sleeve.

4. The hose as claimed in claim 2 wherein said vent means comprises:

a hole through said middle part of said inner coupling sleeve.

* * * * *